US007789931B2

(12) United States Patent
Burnham et al.

(10) Patent No.: US 7,789,931 B2
(45) Date of Patent: Sep. 7, 2010

(54) ORGANIC RECYCLING WITH METAL ADDITION

(75) Inventors: Jeffrey C. Burnham, Naples, FL (US); Gary L. Dahms, Soda Springs, ID (US)

(73) Assignee: Unity Envirotech LLC, Boca Raton, FL (US)

( * ) Notice: Subject to any disclaimer, the term of this patent is extended or adjusted under 35 U.S.C. 154(b) by 452 days.

(21) Appl. No.: 11/803,471

(22) Filed: May 14, 2007

(65) Prior Publication Data

US 2008/0034822 A1 Feb. 14, 2008

Related U.S. Application Data

(63) Continuation of application No. 10/854,677, filed on May 27, 2004, now abandoned.

(60) Provisional application No. 60/473,197, filed on May 27, 2003, provisional application No. 60/473,198, filed on May 27, 2003.

(51) Int. Cl.
C05F 7/00 (2006.01)
C05F 11/00 (2006.01)
C05D 9/02 (2006.01)

(52) U.S. Cl. .................. 71/11; 71/12; 71/13; 71/21; 71/31; 71/63; 71/64.03

(58) Field of Classification Search ............... 71/11–26, 71/64.03, 31, 63
See application file for complete search history.

(56) References Cited

U.S. PATENT DOCUMENTS

| 3,050,383 | A | * | 8/1962 | Wilson | 71/11 |
|---|---|---|---|---|---|
| 4,219,347 | A | * | 8/1980 | Young | 71/11 |
| 4,792,349 | A | * | 12/1988 | Trimm et al. | 71/31 |
| 6,409,789 | B1 | * | 6/2002 | Gilbert | 71/15 |
| 6,517,599 | B2 | * | 2/2003 | Gilbert | 71/15 |
| 7,604,742 | B2 | * | 10/2009 | Shankar et al. | 210/602 |
| 2003/0070460 | A1 | * | 4/2003 | Logan et al. | 71/11 |
| 2003/0089151 | A1 | * | 5/2003 | Logan et al. | 71/11 |
| 2003/0136165 | A1 | * | 7/2003 | Logan et al. | 71/11 |

* cited by examiner

*Primary Examiner*—Wayne Langel
(74) *Attorney, Agent, or Firm*—Drinker Biddle & Reath LLP

(57) ABSTRACT

The invention is directed to methods for producing a granular nitrogen fertilizer from an organic material comprising adding a metallic salt to said organic material to form a slurry. Preferably the organic material comprises dewatered biosolids and contains water from a scrubber. Metallic salts that can be used comprise a salt of iron, zinc, or a mixture thereof. Preferred iron salts comprises ferric sulfate or ferric oxide, and preferred zinc salts comprises zinc sulfate or zinc oxide. Preferably, the metallic salt is mixed with an acid such as sulfuric acid to form an acidified metal salt. Slurry pH ranges from approximately 2-2.5. The acidified metal salt is added to the organic material in sufficient quantity to lower viscosity of the slurry such that the resulting fluid does not hinder fluid flow during operation. When the metallic salt comprises acidified ferric sulfate or ferrous sulfate, sufficient iron can be present to produce a fertilizer product with 0.1 weight percent to 10 weight percent iron sulfate calculated on a dry weight basis. The invention is also directed to fertilizer products made by the methods of the invention. Preferred products are granules and the metallic salt increases product hardness. Fertilizer granules preferably contain metal that is bioavailable to a plant when used as a fertilizer. Solubility of the metal of the product in water is enhanced, and the product is low staining.

8 Claims, 3 Drawing Sheets

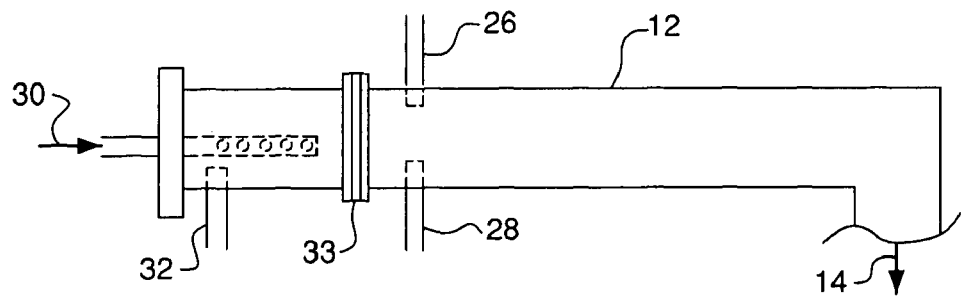
FIG. 2
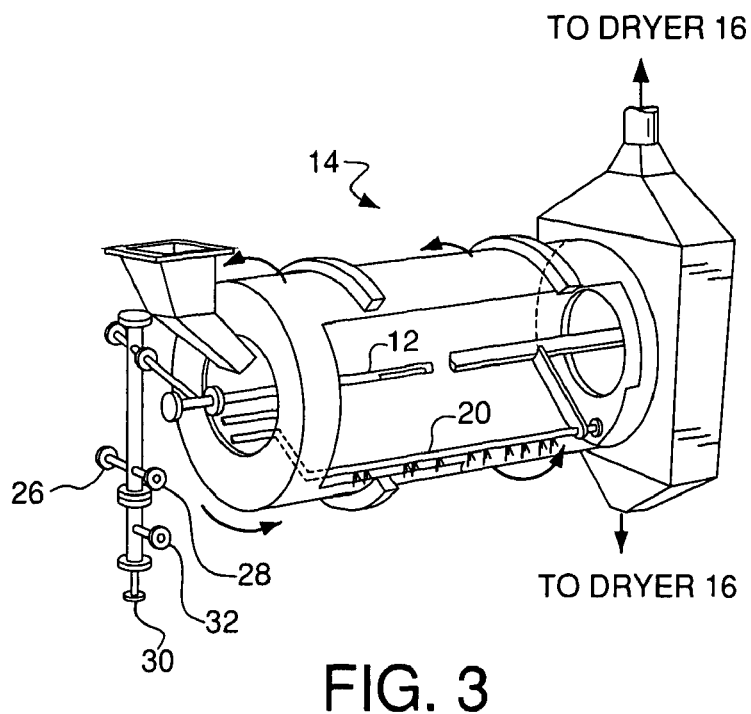
FIG. 3
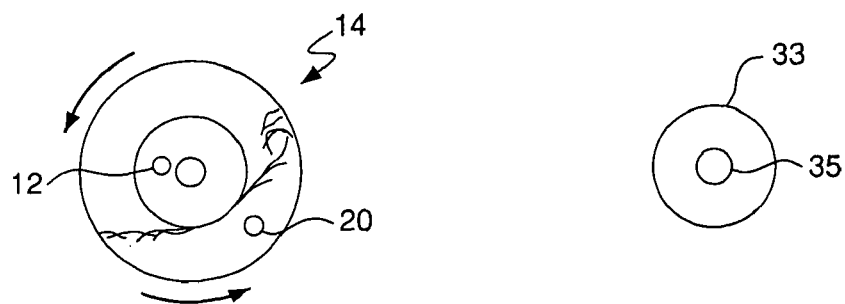
FIG. 4
FIG. 5

ORGANIC RECYCLING WITH METAL ADDITION

REFERENCE TO RELATED APPLICATIONS

This application is a continuation of U.S. patent application Ser. No. 10/854,677, filed May 27, 2004 now abandoned, which claims priority to U.S. Provisional Application No. 60/473,197 filed May 27, 2003 entitled "Organic Recycling with Metal Addition," and U.S. Provisional Application No. 60/473,198 filed May 27, 2003 entitled "Liquid Fertilizer Incorporating Biosolids and High Concentrations of Ammonia," the entirety of which are both hereby incorporated by reference.

BACKGROUND

1. Field of the Invention

This invention is directed to systems, devices and methods for converting organic material into fertilizer. More specifically, the invention relates to adding iron sulfate or other metallic salts to organic material prior to producing fertilizer from the organic material.

2. Description of the Background

The disposal of sewage sludge is a significant world-wide problem. Current methods of disposing of sewage sludge include incineration, direct land or ocean application, heating and drying the sludge for sterilization and then applying it to land, depositing it in a landfill, or granulating the sludge with a standard rotary granulator with heating and drying being provided by exogenous heat sources (e.g. by burning purchased fuel). While some of these methods result in a fertilizer, such fertilizers are of relatively low analysis with regard to their plant nutrient value.

Methods of expressing a fertilizer's plant nutrient value involve identifying the fertilizer's NPK value, wherein N relates to the amount of nitrogen, P relates to the amount of phosphorus (expressed as $P_2O_5$), and K relates to the amount of potassium (expressed as $K_2O$). Thus, as reported in U.S. Pat. No. 3,050,383, sewage sludge with a 2.5/2.5/0 value contains two and a half percent nitrogen, two and a half percent phosphorous as $P_2O_5$, and zero percent potassium as $K_2O$. Except as otherwise indicated by usage, all percentage values herein are weight-based percentages (i.e. w/w).

Fortunately, methods exist for enhancing the nutrient value of relatively low analysis organic waste material. For instance, in the aforementioned Wilson patent (the contents of which are entirely incorporated herein by reference), a method is disclosed for treating dried animal manure and sewage sludge with controlled amounts of an acid, such as sulfuric acid, phosphoric acid (or an equivalent phosphorous compound, the strength of which is expressed as phosphoric acid), or mixtures thereof, and an aqueous ammoniacal solution, such as aqueous ammonia or ammoniacal nitrogen salt-containing solutions and tumbling the resulting reaction mass to form fertilizer granules having an upgraded or enhanced plant nutrient value.

Other methods of enhancing the plant nutrient value of relatively low analysis organic waste material with acids, bases, or mixtures thereof have also been described (e.g. U.S. Pat. No. 4,743,287, U.S. Defensive Publication T955,002, Norton et al. (Feb. 1, 1977), U.S. Pat. Nos. 5,466,273, 5,125, 951, 5,118,337, 5,393,317, and 5,422,015.

Tubular reactors are known in the art for producing ammonia salts (e.g. U.S. Pat. Nos. 6,117,406, 2,902,342, 2,755,176, and 2,568,901, the contents of which are hereby incorporated by reference). Exothermic reactions are carried out in the tubular reactors by reacting a base with an acid in the reactor tube. European Patent Publication 770,586A1 also discloses that tubular reactors may be used for the treatment of relatively low analysis organic waste material. This European Patent Publication generally describes a process of treating such organic waste by introducing the organic waste, ammonia, and an acid into a tubular reactor, carrying out an exothermic reaction, separating vapor from sludge, and then further processing the sludge.

A component typically associated with tubular reactors is a preneutralizer. The preneutralizer is typically used in conjunction with tubular reactors to effect partial neutralization of the acid prior to its introduction into the reactor. However, the use of a preneutralizer poses various disadvantages including difficulty in obtaining accurate control of flow rates. Additionally, operating and equipment costs associated with the use of a preneutralizer often represent a significant expense.

A reactor similar to the tubular reactor is the pipe-cross reactor. Pipe-cross reactors similarly allow for an exothermic reaction to take place, but typically involve the introduction of one or two different acid solutions for reaction with a base in a method to thoroughly mix the reagents. This is an important feature of pipe-cross reactors as it eliminates the need for a preneutralizer. At the first stage of the cross pipe reactor, the base and/or scrubber water and organic material solution are premixed. At the second step, pipe-cross reactors are formed with up to two acid inlets configured such that the acid solutions are introduced perpendicular to the pipe cross reactor as substantially opposing streams. The perpendicular entry and opposing streams allow for thorough mixing of the acids within the reactor, thus eliminating the need for extraneous equipment such as a preneutralizer.

Pipe-cross reactors are well-known and have been used in the past to produce granular NPKS fertilizers from liquid chemicals (e.g. *Energy Efficient Fertilizer Production with the Pipe-Cross Reactor* (U.S. Dept. of Energy, 1982) (a pipe-cross reactor fit into the granulator drum of a conventional ammoniation-granulation system); Achorn et al., "Optimizing Use of Energy in the Production of Granular Ammonium Phosphate Fertilizer" (1982 Technical Conference of ISMA, Pallini Beach, Greece); British Sulfur Corp. Ltd., "TVA modifies its pipe reactor for increased versatility", *Phosphorus & Potassium*, No. 90, pp. 25-30 (1977); Achorn et al., "Efficient Use of Energy in Production of Granular and Fluid Ammonium Phosphate Fertilizers" (1982 Fertilization Association of India Seminar, New Dehli, India); Salladay et al. "Commercialization of the TVA Pipe-Cross Reactor in Regional NPKS and DAP Granulation Plants in the United States" (1980 Fertilization Association of India Seminar, New Dehli, India); U.S. Pat. Nos. 4,619,684; 4,377,406; 4,134,750; U.S. Defensive Publication T969,002 (Apr. 4, 1978) to Norton et al.; and Salladay et al., "Status of NPKS Ammoniation-Granulation Plants and TVA Pipe-Cross Reactor" (1980 Fertilizer Industry Round Table, Atlanta, Ga., US)). More recently, pipe-cross reactors have been successfully used to enhance the plant nutrient value of relatively low analysis organic waste material (e.g. U.S. Pat. Nos. 5,984,992 and 6,159,263, the entirety of both of which is incorporated by reference herein).

One potential drawback of exothermically treating relatively low analysis organic waste material with reactors, such as a pipe cross reactor or tubular reactor, is the potential for exhausting noxious odors during the process. The use of cross-pipe reactors for treating such waste has helped to reduce the odors typically associated with the treatment thereof. However, a need exists to provide greater assurance that such potential odors are eliminated, or at least reduced beyond current emission levels.

Additionally, a continued desire exists to improve the efficiency of sludge treatment, both in terms of capital expenditure as well as in operating costs.

There is a need in the art for relatively simple and efficient processes for processing relatively low analysis organic waste material to an enhanced plant nutrient value composition without substantial emission of noxious odors. Preferably, such processes would produce products that were sized and shaped to be spread by commercially available commercial spreaders.

SUMMARY OF THE INVENTION

The present invention overcomes the problems and disadvantages associated with current strategies and designs, and provides new methods for the production of fertilizer from organic materials such as, but not limited to biosolids. The invention further provided fertilizers produced by methods of the invention.

One embodiment of the invention is directed to methods for producing a granular nitrogen fertilizer from an organic material comprising adding a metallic salt to said organic material to form a slurry. Preferably the organic material comprises dewatered biosolids and contains water from a scrubber. Metallic salts that can be used comprise a salt of iron, zinc, or a mixture thereof. Preferred iron salts comprises ferric sulfate or ferric oxide, and preferred zinc salts comprises zinc sulfate or zinc oxide. Preferably, the metallic salt is mixed with an acid such as sulfuric acid to form an acidified metal salt. Slurry pH ranges from approximately 2-2.5. The acidified metal salt is added to the organic material in sufficient quantity to lower viscosity of the slurry such that the resulting fluid does not hinder fluid flow during operation. When the metallic salt comprises acidified ferric sulfate or ferrous sulfate, sufficient iron can be present to produce a fertilizer product with 0.1 weight percent to 10 weight percent iron sulfate calculated on a dry weight basis. When sulfuric acid is added to the organic material, it is preferably added prior to reaching a mix tank and at a rate of approximately 1.75 percent of a total feed rate to result in a pH range of 3.0 to 3.5.

Preferably the slurry is pumped into a shear mix tank that contains a high shear rotary agitator which turns at a speed sufficient to produce high shear. Slurry is passed from said shear mix tank to a holding or equilibrium tank containing an agitator. The agitator may provide approximately 2 hours or more of storage for the slurry. Holding or equilibrium tanks can be operated to maintain a pH of 3.0 to 4.0 with a solids content of between 15 percent and 28 percent solids. Metallic salt may chemically bonds with one or more elements of the slurry. When using an iron salt, the iron can bond with ammonium sulfate or ammonium phosphate present in the slurry. This can enhance granulation formation, and reduce sulfur compounds in the slurry, and odor and dust formation during operation.

Preferably the metallic salt initiates chemical hydrolysis of organic molecules in the slurry. This can drive sulfur compounds out of the organic material reducing odorant sources in a resulting fertilizer product.

Preferably the metallic salt is added to the organic material in a pipe-cross reactor or a tubular reactor. The metallic salt enhances reaction kinetics of the pipe-cross reactor and lowers viscosity of the slurry such that operation of the pipe-cross reactor is more controllable that without the metallic salt.

Another embodiment of the invention is directed to fertilizer products made by the methods of the invention. Preferred products are granules and the metallic salt increases product hardness. Product may have a crush weight of greater than 6 pounds or preferably greater than 7 pounds. Granules of fertilizer preferably contain metal that is bioavailable to a plant when used as a fertilizer. Solubility of the metal of the product in water is enhanced, and the product is low staining.

Other embodiments and advantages of the invention are set forth in part in the description, which follows, and in part, may be obvious from this description, or may be learned from the practice of the invention.

DESCRIPTION OF THE DRAWINGS

FIG. 2 A stylized view of a pipe-cross reactor.

FIG. 3 A partially cut away, perspective view of a pipe-cross reactor in a rotary ammoniator-granulator.

FIG. 4 A stylized end view of a rotating bed of material in a granulator.

FIG. 5 A side view of an orifice plate utilized with a pipe-cross reactor.

DESCRIPTION OF THE INVENTION

As embodied and broadly described herein, the present invention is directed to systems and methods for treating organic material. More specifically, the present invention relates to systems and methods for treating sludge and converting sludge into fertilizer.

Figure 1:
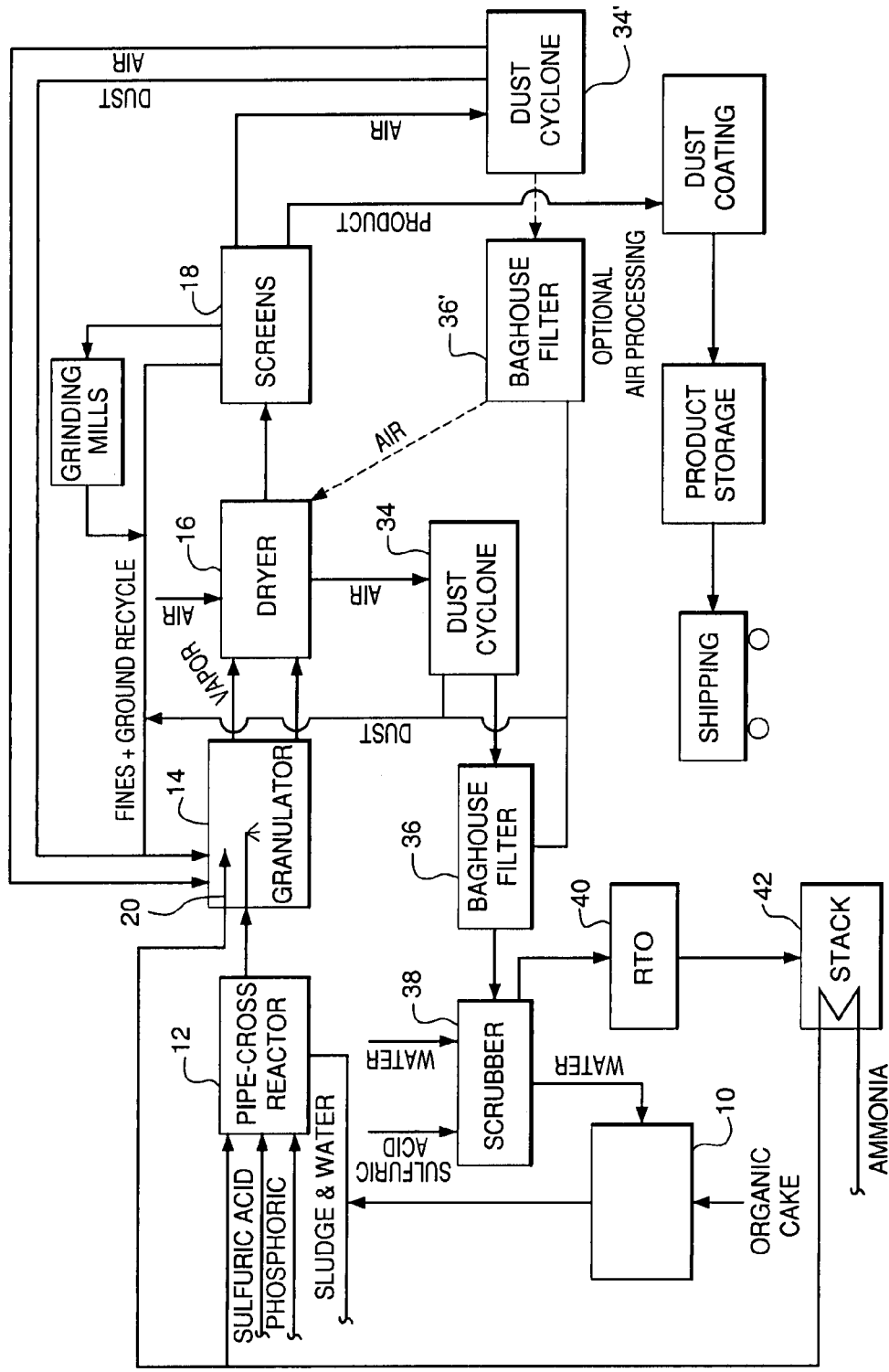
FIG. 1 A process flow diagram of one embodiment of the invention.

As depicted in FIG. 1, a process for enhancing the plant nutrient value of organic waste material generally involves mixing the organic waste material with water 10. A preferred process for mixing the organic material with water is described in FIG. 6. Preferably, this process includes mixing the organic waste and a fluid such as, but not limited to water with a metallic salt, preferably iron. The water used in making the slurry may desirably include scrubber water from the hereinafter described scrubber 38, which may comprise waste acid. The slurry is mixed at a sufficient concentration and consistency such that it will, preferably, process the organic waste material as quickly as possible, but will not clog or block a reactor during operation. A preferred reactor is a pipe-cross reactor 12, but a tubular reactor might alternatively be used, or even used, in a system, in conjunction with a pipe cross reactor. The particular slurry concentrations and consistencies may depend, to some extent, on the size and amount of insoluble particulate material contained in the particular organic waste material and the size and length of the reactor components. However, as delivered to the pipe-cross reactor, the slurry generally has a solids content of at least about 5 percent and possibly as high as about 35%. Preferably, the solids content of the slurry is from about 10% to 30% and more preferably from about 14% to 28%, and more preferably from about 15% to 22%.

As depicted in FIG. 1, the slurry is pumped from the agitation tank 10 to a pipe-cross reactor 12 for an exothermic reaction with, for example, a base such as ammonia and an acid or acids such as sulfuric acid, phosphoric acid, and mixtures thereof, with or without extra water to form a melt.

Amounts of acid and base used in the exothermic process can be determined by one of skill in the art. However, for guidance in the neutralization of ammonia, approximately one mole of sulfuric acid, or two moles of phosphoric compounds expressed as phosphoric acid, is used for each two moles of ammonia. Concerning the concentration of phosphoric acid, typical molar ratios of N:P in the pipe-cross reactor are between 0.4:1 to 0.7:1, preferably 0.55 to 0.65:1, concerning the concentration of sulfuric acid, typical molar ratios of N:S in the pipe cross reactor are between 0.5:1 and 0.8:1 preferably 0:65:1 to 0.72:1. The molar amount of nitrogen should take into consideration not only the amount of ammonia being added but the typical amount of ammoniacal nitrogen contained in the particular organic waste material.

Other acids which may be used with the invention comprise nitric acid, acetic acid, citric acid and mixtures thereof, all of which are well know to those skilled in the art. (e.g., nitric acid and an ammonia compound which might form ammonium nitrate in the presence of organic materials which is explosive). Whatever the acid or acids chosen, the strength of one of the acids used in the process will preferably be equivalent to 90% sulfuric acid (e.g. 93 to 100 percent sulfuric acid).

As depicted in FIG. 2, the pipe-cross reactor 12 is preferably provided with two cross pipes 26, 28 to receive sulfuric acid (at a rate of about 17.2 to 25.8 gpm) and phosphoric acid (at a rate of from about 5.2 to 7.8 gpm). A third pipe 30 incorporates the ammonia into or near the center of the reactor. The length of this pipe 30 is desirably at least twenty to thirty inches to ensure adequate mixing. A third cross pipe 32 incorporates the slurry and additional water into the mixing chamber. Positioned between the third cross pipe 32 and the first and second cross pipes 26 and 28 is an orifice plate 33 which is utilized to introduce turbulence into the flow of the slurry ensuring even greater mixing.

A typical pipe-cross reactor for use with the invention has a diameter of about three to ten inches, is from about seven to about fifty feet long, and terminates in, for example, a two to eight inch discharge pipe (or a slot of equivalent cross-sectional area), preferably with a stainless steel insert or TEFLON™ lining. The discharge pipe preferably discharges into a standard rotating drum granulator 14, and is preferably made of a steel pipe (e.g. HASTELLOY C-276 or 316L stainless steel (with HASTELLOY C or B for the reaction tube)). A TEFLON™, ceramic, or other corrosion-resistant lining may also be used in the pipe-cross reactor. The temperature is preferably maintained below 204° C. (400° F.).

The orifice plate 33, as shown in FIG. 5, includes a plate formed from a material similar to the pipe-cross reactor 12 and includes an orifice 35 or aperture which exhibits a smaller diameter than that of the pipe-cross reactor 12. Thus, for example, a pipe-cross reactor having a (6) inch diameter would employ an orifice plate 33 having an orifice 35 which exhibited a diameter less than inches, for example inches. In determining the size of the orifice 35, various parameters may be considered including flow rates of the slurry, acids and base, as well as the solid content of the slurry. Thus, the size of the orifice 35 may be changed for a given pipe-cross reactor 12 if the any process parameters are altered.

Although FIG. 5 shows use of a circular orifice plate, it was surprisingly discovered that adding a protuberance generally to increase turbulence upstream of the two pipe cross reactor provides greater heat recovery. In other embodiments, the turbulence is created through use of a protuberance, such as a bump, multiple bumps in series or parallel with respect to the flow stream, one or more wires, input of pressurized gas such as air, use of a sonic vibrator or vibrating wall at this position. For example, two, three, four, five, six, seven, eight or more equally spaced bumps that each protrude into the space towards the lumen middle, by, for example, 0.02, 0.05, 0.1, 0.2, or 0.3 times the diameter at that point may be used to create turbulence. In an embodiment a bump is an annular thickening that forms a constriction within the pipe. A sonic vibrator for example such as that offered by Advanced Sonics, also may be used. A restriction, as shown in FIGS. 2 and 5, does not have to be round but can be another cross sectional shape, such as oval, square or irregular. An oval share is desirable, particularly with the narrow ends pointed to the cross pipes such that the larger oval axis extends across a line connecting the two cross pipe openings. In another embodiment the short axis of the oval extends across a line connecting the two cross pipes. The oval shape with long matching axis provides a turbulence that more closely matches the incoming flows from the perpendicular cross reactors and is particularly desired when perpendicular cross pipe reactors as shown in FIG. 2 are used.

The optimum placement of the protuberance(s) in many embodiments is between 0.1 to 3 flow stream diameters upstream of the average position of the cross reactor outlets (i.e. mean of the cross reactor outlets, which may be staggered down the length of the flow stream). More preferably the protuberances are located between 0.3 to 1.5 diameters ahead of the cross pipe reactors. Optimum placement will vary depending on the flow rate. For a very high flow rate the protuberance(s) should be set further away or the degree of protuberance into the flow path should be limited. This embodiment may be carried out by an adjustable annular ring or adjustable bumps that provide the ability to control the distance away and the degree of flow path entry of the protuberance. An annular ring may be adjusted for opening size and may be mounted at alternative locations, for example. Multiple sonic vibrators, if used may be placed at different locations and individually switched to accommodate slower (vibrate closer to the cross pipes) or faster (further away location) flow rate and/or lowered viscosity.

Adjustment of the cross pipe reactor itself may be optimized for a given viscosity and flow rate. In many embodiments the cross reactor pipes advantageously are exactly opposite each other, as shown in FIG. 2. This placement is desirable when adding comparable viscosity fluids at comparable flow rates. Also desirable, is the use of multiple (3 or 4, or more) cross pipes. For example, a four way (four perpendicular pipes) that administers two materials each through two opposing sides, may be used if the viscosity is low enough. Multiple cross reactor pipes may be switched to accommodate changes in viscosity and/or flow rate. For example a less viscous material or higher flow rate system may benefit by using one or more cross reactor inlets that are further away (more downstream) with respect to the protuberance(s) and that can be opened and closed. Other combinations may be optimized upon routine calibration, by changing the flow, and/or type of sludge material and/or a reagent and then monitoring for heat recovery by measuring temperature downstream at one or more points. By providing adjustable protuberance(s), and/or cross pipe placements, and/or flow rates optimized heat recovery may be obtained.

Yet another embodiment provides an automatic system that constantly monitors temperature of mixed material at some point downstream of the cross pipe reactor and adjusts protuberance positioning, flow rate of sludge, flow rate of base, flow rate of added water, flow rate of one or more acids, and switching of cross reactor outlets for optimum effect. In a desirable embodiment flow rate of base, and/or dilution water and/or an acid and/or a second acid and/or sludge is adjusted up or down to obtain a higher temperature. In another embodiment a switch selects between two or more cross pipes to obtain a more desirable temperature. In yet another embodiment some of the released heat is transferred in a controllable way back to an input stream to obtain a more desirable viscosity for adequate mixing. A control system may adjust heat transfer up or down depending on the heat recovered, or depending on another monitored variable, such as back pressure to the sludge pump(s) or back pressure measured at a pipe-cross reactor gauge.

Without wishing to be bound by any one theory of this embodiment of the invention, a protuberance such as an orifice plate or other mechanism or device allows greater mixing of the slurry by inducing a zone of turbulence downstream of the orifice plate 33 and generally in the vicinity of the first and second cross pipes 26 and 28. The increased turbulence generated in many cases increases heat production as measured as a higher melt temperature. The temperature also can be measured at or downstream of the last cross pipe addition of reagent, such as for example, 1 or 2 pipe diameters further downstream of the last cross pipe. It has been observed that use of an orifice plate has effected an increase of heat recovery, as much as approximately 30%, over similar pipe-cross reactors lacking an orifice plate. An orifice plate 33 may be changed for another orifice plate exhibiting a different diameter orifice 35 if desired.

Referring to FIG. 2, ammonia is introduced into the representative system depicted here at a rate of from about 4.3 gpm. Organic waste material (e.g. sewage sludge) and water are incorporated at a rate of from about 30 to about 40 gpm of slurry. The pipe-cross reactor shown here typically operates at a gage pressure of between fifteen and sixty psig.

A hot melt discharges from the pipe-cross reactor 12 into the granulator 14, while water flashes from the reactor product as it issues into the granulator 14. Steam is generated by the exothermic reaction conducted within the pipe-cross reactor 12.

A preferred granulator (e.g. an ammoniator-granulator), depicted in FIGS. 3 and 4, is a two to four meter diameter rotating drum granulator having a length of from about five to about nine meters. As shown in FIG. 3, the pipe-cross reactor 12 is oriented vertically and includes a number of 90 transitions or bends prior to entering the granulator 14. The shown position of the pipe-cross reactor 12 is preferred as it provides greater mixing capabilities. However, satisfactory results may be achieved with the pipe-cross reactor 12 oriented horizontally without any transitions or bends (e.g. U.S. Pat. Nos. 5,984,992 and 6,159,263).

In the depicted process, the granulator 14 includes an ammonia sparger 20 operably positioned within the granulator 14 for the addition of ammonia to the melt to complete the reaction of acid and base for the final product. The melt is rolled onto recycled fine particles within the granulator 14 to form granulated particles, thus causing the granulated particles to grow to a desired size. Afterwards, as depicted in FIG. 1, these granulated particles are passed into a rotary dryer 16 for a sufficient amount of time to reduce their moisture content, thus forming a fertilizer having an enhanced plant nutrient value. The vapors formed during the reaction of the slurry with the acid and base (e.g. the flashed off steam) are also collected and conveyed into the rotary dryer 16 for increasing the dew point vapors so as not to condense in the plant equipment.

Passing such vapors directly into the dryer 16 is an alternative process as compared to that of U.S. Pat. Nos. 5,984,992 and 6,159,263. Previous processes associated with pipe-cross reactors have typically separated the granulated particles from the vapor for independent processing prior to the drying of the granulated particles. The presently depicted process eliminates the need for additional particulate separation equipment and processing of the air and ultimately results in a simpler and more efficient process.

A preferred dryer for use with the invention is a two to four meter diameter rotating drum dryer having a length of from about seventeen to about thirty three meters, and having a heating capacity of 30 to 70 million BTU/hour, with a lump crusher at the discharge end.

The process further includes passing the dried granulated particles to a granule separation apparatus, such as a screen 18, and separating the dried granulated material into fines, product and oversized material. Oversized material is reduced in size to be incorporated, as a fine, back into the process. The fines are returned to the granulator 14 (along with potash or any micronutrients required for the desired final product analysis) for incorporation into the process.

During the process, fumes, which may contain ammonia, particulates, and water vapor above its dew point, are collected from the dryer 16 and passed through particulate separating equipment, such as a dust cyclone 34. The dust cyclone 34 removes a portion of the particulates from the air and recycles these particulates (e.g. dust) with the fines and ground material. The resultant fumes leave the dust cyclone 34 and are processed through additional particulate separating equipment, such as a baghouse filter 36. The baghouse filter serves to remove an additional amount of particulates, particularly particulates which exhibit a smaller size than those removed by the dust cyclone 34. Particulates removed from the baghouse filter 36 are similarly recycled with the fines and ground material for use in the granulator 14.

The fumes leaving the baghouse filter 36 are subsequently processed through a scrubber 38, such as a venturi scrubber or packed bed scrubber, which includes water separation chambers for collecting ammonia fumes and small dust particles. The invention uses low pH water in the scrubber 38 to collect unreacted ammonia vapors escaping the granulator 14. In one embodiment, small amounts of sulfuric or phosphoric acid are added to the scrubber 38 to maintain a low pH (e.g. 2 to 3) for proper ammonia vapor scrubbing.

The process further includes oxidizing the air exiting the scrubber, such as in a regenerative thermal oxidizer (RTO) 40. The RTO 40 is used to destroy volatile organic compounds (VOCs) and other gaseous hydrocarbon pollutants that would otherwise be released into the atmosphere. The RTO 40 destroys such VOCs and hydrocarbon fumes through a process of high temperature thermal oxidation, converting the VOCs and fumes to carbon dioxide and water vapor. The oxidation of the air further serves to substantially eliminate any noxious odors that would otherwise be exhausted into the atmosphere. Energy released from the oxidation process can be recycled to reduce operating costs.

Air is drawn from the RTO 40 and exhausted into the atmosphere through a stack 42. The process may advantageously include using heat from the exhaust in the stack 42 to preheat the base (e.g. ammonia) prior to its introduction into the pipe-cross reactor 12 and/or the granulator 14 via the sparger 20.

Another aspect of the ventilation for the depicted process includes collecting air from the screens 18. The process contemplates two options, both of which involve particulate removal and recycling of both particulates and air. The first option includes processing the air through a dust cyclone 34 and recycling both the particulates and the air back to the granulator 14. The second option includes utilizing the dust cyclone 34, but further includes processing the air through a baghouse filter 36, again collecting the particulates for recycling in the granulator. The air leaving the baghouse filter 36 is advanced to the dryer 16 instead of the granulator 14.

Other aspects of a ventilation system for use with the invention preferably include fans for moving the air to and from the various processing stages described above herein. Volume of air moved is determined by the amount of moisture to be removed (above dew point) and the melting point or disassociation temperature of the fertilizer product.

NPK fertilizers preferably include the micronutrients iron and zinc. In a preferred embodiment, spent acid from a hot dip galvanizing or steel pickling process is used to maintain the low pH of the scrubber water. These spent acids commonly are sulfuric acid of five to ten percent strength, containing three to eight percent iron. Galvanizing spent acid contains three to eight percent zinc along with iron. The iron and zinc are fed with the ammonia-laden scrubber water from scrubbing to the sludge slurry tank and on to the pipe-cross reactor for incorporation as iron and zinc micronutrients in the final NPK fertilizer. In the case of spent sulfuric acid, the sulfur also becomes a nutrient in the resulting fertilizer, since it reacts in the pipe-cross reactor to form ammonium sulfate.

Other micronutrients or additional ingredients may be incorporated into the resulting fertilizer by adding them with a weigh feeder as a dry solid to the fines recycle stream. Micronutrients or additional ingredients preferably include lime, dolomite, calcite, hydrobiotite, gypsum, phosphates (e.g. rock phosphate or ammonium phosphate), potash, urea, soil clays, calcium peroxide, ammonium nitrate, vermiculite, humic acid, and trace minerals such as iron, manganese, magnesium, boron, copper, and zinc, and combinations thereof.

Although the invention has been most particularly described for the processing of municipal sewage sludge, the inventive process may also be used to enhance the plant nutrient value of other relatively low analysis organic waste material such as poultry manure, food processing wastes, wastes from paper manufacturing, swine manure sludge, environmental or industrial biological materials, mixtures thereof, and the like. In such a case, the particular relatively low analysis organic waste material is substituted for the sewage sludge in the process, and the process parameters are accordingly modified.

The following examples are offered to illustrate embodiments of the present invention, but should not be viewed as limiting the scope of the invention.

EXAMPLES

Example 1

In an agitation tank, 6700 kilograms/hour (7.4 tons/hour) of sewage sludge were mixed with 37 liters per minute (ten gallons/minute (gpm)) of scrubber water to form a slurry. The slurry was of such a consistency (a solids content varying between 10% and 27%) that it can be pumped with a positive displacement pump or other suitable pump to a pipe-cross reactor equipped to receive ammonia, sulfuric acid, phosphoric acid, sewage sludge, and water. The pipe-cross reactor had a diameter of approximately four inches and was forty feet long. The pipe-cross reactor terminated in a rotating drum granulator. The rotating drum granulator was six feet in diameter and twenty feet long.

The slurry was added to the pipe-cross reactor and reacted with 8.6 gpm 99.5% ammonia, 8.6 gpm sulfuric acid (93%), and 2.6 gpm phosphoric acid (54% $P_2O_5$). The temperature of the pipe-cross reactor (due to the exothermic reaction between the acid and the base) was maintained at about 149° C. (300° F.) with moisture in the sludge. This temperature (above minimum sterilization temperature) acts to kill *Salmonella*, *E. coli*, and other pathogens which may be found in the slurry. This temperature also acts to deodorize the material somewhat.

The resulting melt from the pipe-cross reactor is sprayed onto a recycling bed of fines, along with 2000 pounds of added potassium chloride (60% $K_2O$) while the water contained in the melt flashed off as steam. An ammonia sparger is provided in the granulator to add small amounts of ammonia to the granulation mixture for reaction completion and final hardening of granules.

Operating the pipe-cross reactor in such a manner incorporated approximately 14.8 tons per hour of 20% solid sewage sludge at a ten ton per hour production rate.

Granulated material exits the granulator at about 93° C. (200° F.) and at about a five to fifteen percent moisture content into a rotary dryer. The rotary dryer was approximately two meters in diameter and has a length of about twenty meters. It has a heating capacity of 30 million BTU/hour and is associated with a lump crusher or lump breaker at the discharge end. The moisture in the material was reduced to less than three percent by heated forced air in the dryer.

Materials exiting the rotary dryer were run through the lump crusher to reduce oversized material to less than one inch in size.

Screens are used to separate the material into (a) fines, (b) product and (c) oversized material. Fines are returned to the granulator. Product went to a two meter diameter, twenty meter long cooler and then on to storage, while the oversized material is passed through a grinding mill and reduced to fines for recycling to the granulator. About two tons (1800 kg) of fine material per ton of product were required in the recycle stream.

Fumes from the granulator containing steam, ammonia and particulate were collected by maintaining a negative pressure inside the granulator with a fan pulling the fumes into the rotary dryer to reduce the moisture content thereof. The air was drawn from the granulator at a rate of 20,000 cubic feet per minute (cfm) at a temperature of 92° C. (198° F.) and at 100% relative humidity. This is roughly equivalent to conveying 34,200 pounds per hour (lbs/hr) of water and 296 pounds per minute (lbs/min) of dry air.

The air from the rotary dryer was directed to a dust cyclone, a baghouse filter, and then a scrubber. Air was drawn from the dryer at a rate of 70,000 cfm at 45% relative humidity. The air leaving the dryer had a dry bulb temperature of approximately 93° C. (200° F.) and a wet bulb temperature of 74° C. (165° F.). This is roughly equivalent of conveying 56,100 lbs/hr water and 2,711 lbs/min of dry air. Air entering the scrubber is scrubbed with low pH water (water at a pH lowered by the addition of spent acid from a hot dip galvanizing process). If galvanizing acid is unavailable, the pH may be controlled with phosphoric or sulfuric acid. The low pH water collects ammonia vapor present in the fumes, as well as dust particles.

Air was directed from the scrubber to a regenerative thermal oxidizer at a rate of 67,100 cfm at a temperature of 165° F. and at 100% relative humidity. Oxidized air was then drawn from the regenerative thermal oxidizer and is exhausted through a stack approximately one hundred (100) feet tall at a temperature of 93° C. (200° F.).

Dust-laden air is collected from the grinding mills and screens by a fan maintaining negative pressure on the equipment. The air is pulled through a cyclone system that removes about 97% of the dust. From the cyclones, the air was passed back to the rotary granulator and the dust added to the recycled fines.

The resulting fertilizer had an NPK value of 12-3-6 (12% nitrogen, 3% phosphate, and 6% potash). It was also homogenous and properly sized for standard application equipment.

Example 2

The process of Example 1 is repeated in a tubular reactor rather than a pipe cross reactor. In an agitation tank, 6700 kilograms/hour (7.4 tons/hour) of sewage sludge are mixed with 37 liters per minute (ten gallons/minute (gpm)) of scrubber water to form a slurry. The slurry is of such a consistency that it can be pumped with a positive displacement pump or other suitable pump to a tubular reactor equipped to receive ammonia, sulfuric acid, phosphoric acid, sewage sludge, and water. The tubular reactor preferably has a diameter of approximately 1.5 to 30 cm and a length of 2 to 10 meters, preferably 5 to 8 meters. The reactor terminates in a rotating drum granulator. The rotating drum granulator is six feet in diameter and twenty feet long.

The slurry is added to the reactor and reacted with 8.6 gpm 99.5% ammonia, and an acid solution containing 8.6 gpm sulfuric acid (93%) and 2.6 gpm phosphoric acid (54% $P_2O_5$). The temperature of the reactor (due to the exothermic reaction between the acid solution and the base) is maintained at about 149° C. (300° F.) with moisture in the sludge.

The resulting melt from the reactor is sprayed onto a recycling bed of fines, along with 2000 pounds of added potassium chloride (60% $K_2O$) while the water contained in the melt flashes off as steam. An ammonia sparger is provided in the granulator to add small amounts of ammonia to the granulation mixture for reaction completion and final hardening of the granules.

Granulated material exits the granulator at about with a moisture content into a rotary dryer. The rotary dryer is approximately two meters in diameter and has a length of about twenty meters. It has a heating capacity of 30 million BTU/hour and is associated with a lump crusher or lump breaker at the discharge end. The moisture in the material is reduced to less than three percent by heated forced air in the dryer.

Materials exiting the rotary dryer are run through the lump crusher to reduce oversized material to less than one inch in size.

Screens are used to separate the material into (a) fines, (b) product and (c) oversized material. Fines are returned to the granulator. Product goes to a two meter diameter, twenty meter long cooler and then on to storage, while the oversized material is passed through a grinding mill and reduced to fines for recycling to the granulator. About two tons (1800 kg) of fine material per ton of product are required in the recycle stream.

Fumes from the granulator containing steam, ammonia and particulate are collected by maintaining a negative pressure inside the granulator with a fan pulling the fumes into the rotary dryer to reduce the moisture content thereof. Air is drawn from the granulator at a rate of 20,000 cubic feet per minute (cfm) at a temperature of 92° C. (198° F.) and at 100% relative humidity. This is roughly equivalent of conveying 34,200 pounds per hour (lbs/hr) of water and 296 pounds per minute (lbs/min) of dry air.

The air from the rotary dryer is conveyed to a dust cyclone, a baghouse filter, and then a scrubber. Air is drawn from the dryer at a rate of 70,000 cfm at 45% relative humidity. The air leaving the dryer has a dry bulb temperature of 93° C. (200° F.) and a wet bulb temperature of 74° C. (165° F.). This is roughly equivalent of conveying 56,100 lbs/hr water and 2,711 lbs/min of dry air. Air entering the scrubber is scrubbed with low pH water. The low pH water collects ammonia vapor present in the fumes, as well as dust particles.

Air is conveyed from the scrubber to a regenerative thermal oxidizer at a rate of 67,100 cfm at a temperature of (165° F.) and at 100% relative humidity. Oxidized air is then drawn from the regenerative thermal oxidizer and is exhausted through a stack approximately one hundred feet tall at a temperature of 93° C. (200° F.).

Dust-laden air is collected from the grinding mills and screens by a fan maintaining negative pressure on the equipment. The air is pulled through a cyclone system that removes about 97% of the dust. From the cyclones, the air is passed back to the rotary granulator and the dust is added to the recycled fines. The resulting fertilizer is determined to have an NPK value.

Example 3

Figure 6:
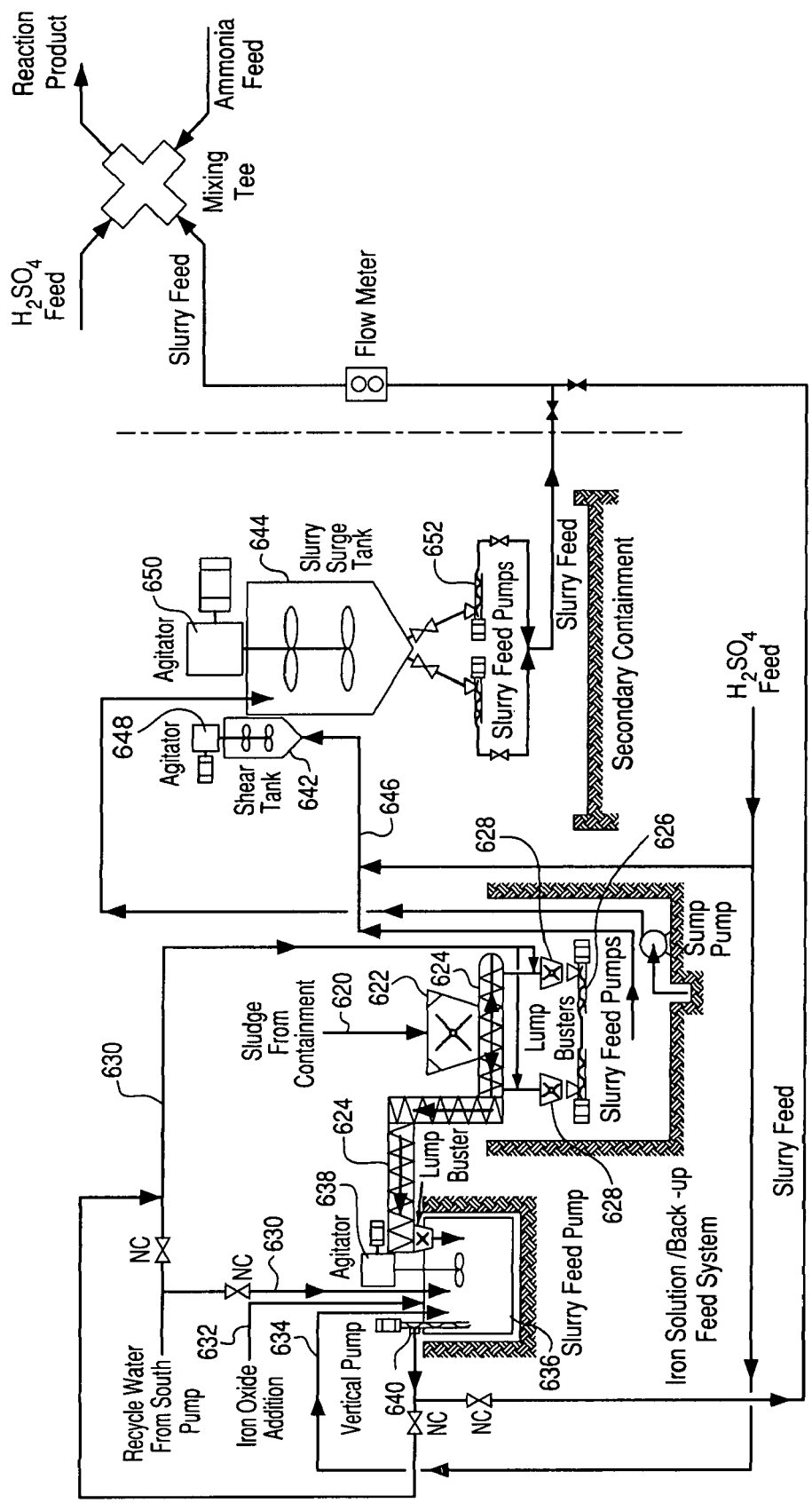
FIG. 6 A process diagram of one embodiment of pre-treating the sludge.

FIG. 6 shows one preferred method of preparing and handling the biosolids prior to their conversion into fertilizer.

In FIG. 6, municipal biosolids 620 are dispensed into 625 cubic yard boxes. These boxes are preferably placed on suitably designed dumping vehicles and transported to the sludge handling area. The boxes are opened and dumped into a receiving hopper 622. The receiving hopper 622 preferably has a minimum containment volume of about 47 cubic yards. The maximum volume of hopper 622 is dictated by the available space and general physical arrangement of the plant. The hopper 622 is preferably constructed of stainless steel to protect against corrosion as a result of the wet environment in the area. A large open grate is preferably installed inside the hopper to capture any large tramp materials that may be present in the sludge boxes. Preferably, this grating has openings of approximately 1'×1'.

Sludge 620 passes through the grating into the bottom of the hopper 622. At the bottom of hopper 622, horizontal double helix screws 624 are used. The double helix screws initiate the transport of the sludge 620 from the hopper 622 to the transfer pumps 626. The number, size and arrangement of the screws are dictated by the geometry of the hopper 622. In one embodiment, four screws are used in an alternating manner to control the feed rate of the sludge 620. A variety of screws can be used. The screws are preferably driven by direct drive gear motors operated at a speed sufficient to provide the required quantity of sludge 620 for the process. The delivery rate of sludge 20 can be further controlled by sequencing the operation of the screws and controlling the operating versus non-operating time for each.

The screws in the bottom of the hopper 620 discharge into a horizontal, perpendicular collection screw 624 at one end of the hopper. The collection screw 24 is used to collect the sludge 620 from the transport screws and transfer it to one of two sludge pumps 626. This screw 624 can be of similar construction and motor arrangement as the transport screws. The collection screw 624 is preferably sized to provide the maximum required sludge delivery rate. The collection screw 624 is preferably designed to operate in either direction to provide movement of the sludge to different pump suction locations. Ports are installed in the bottom of the screw housing to direct the sludge to the currently operating sludge pump 626.

Vertical piping (24") is preferably installed from the collection screw 24 housing to the suction of the sludge pumps 626. Preferably, a rotary lump breaker 628 is installed in this piping. The lump breaker 628 is a rotary blade and grating system operated at a speed suitable to facilitate the flow of the semi-solid sludge 620 to the pumps 626. The lump breaker has two primary functions: 1) to break any large lumps in the sludge 620 into smaller, more manageable pieces and 2) to capture any small tramp materials before they can reach the pumps 626. The lump breaker 628 has the added benefit of imparting shear force to the sludge 620 to begin the breakdown of polymeric binders in the sludge cake.

Water 630 is preferably injected into the sludge flow 620 prior to the lump breaker. This water 630 aids in the liquefaction of the sludge 620 and is controlled so as to provide the final sludge concentration desired. Preferably water 630 includes recycle water the process venturi scrubber having a pH of about 2.5 to 4.0. The water 630 is preferably added at a rate equal to at least 10% of the desired reactor flow, more preferably at least 15%, and most preferably at least 20%. In one embodiment the flow rate is approximately 22.9% of the desired reactor flow.

In another embodiment, preferably, ferrous oxide 632 and sulfuric acid 634 is also added to the water stream 630 in the process sump 636. Such additions minimize the amount of water that needs to be added to the sludge such that the slurry that is created will not clog or block the pipe-cross or tubular reactor. In one embodiment, process sump 636 is a stainless steel lined concrete tank with dimensions of approximately 11'×11'×11'. In the sump 636, the sulfuric acid 634 reacts with the ferrous oxide 632 to produce ferrous sulfate such that the mixture has a resultant pH of approximately 2.0 to 2.5 prior to its being added to the biosolids. Alternatively, ferric oxide is used and reacts with the sulfuric acid to produce ferric sulfate such that the mixture has a resultant pH of approximately 2.0 to 2.5 prior to its being added to the biosolids. The mixture in the sump is agitated with a vertical agitator 638.

The sheared sludge discharges from the lump breaker 628 into the suction of the sludge transfer pump 42. The sludge pumps 40 discharge into an 8" stainless steel header that flows to a high speed mix tank 42. Prior to reaching the mix tank 644, sulfuric acid 646 is injected into the flow stream to control the pH of the final sludge mix at a range of 3.0 to 3.5. The sulfuric addition rate is approximately 1.75% of the total reactor feed rate.

The sludge/acid mix flows into the bottom of the shear mix tank 642. In one embodiment, tank shear mix tank 642 is an 890 gallon vertical cylindrical tank with a high speed, high shear rotary agitator 648 sufficient to produce significant shear of the acidified biosolids mixture.

In one embodiment, the slurry holding tank is a tank with a volume of 14,800 gallons and is of stainless steel construction. It contains a vertical agitator 650 with two sets of blades. The holding tank 650 is designed to provide approximately 2 hours of storage for the slurry feed, at maximum feed rates. It is operated to maintain a pH of 3.0 to 4.0 with a solids content of between 15 percent and 28 percent solids and preferably at 20 percent to 23 percent.

Reactor feed is drawn continuously from the bottom of the holding tank 50 into the suction of the slurry feed pump 652. The sludge feed rate to the reactor is controlled by adjusting the slurry feed pump 652 motor speed.

FIG. 6 shows a one process for adding iron (ferric) sulfate into the sludge prior to reacting the sludge with acid and ammonia to produce fertilizer as described in FIG. 1. In addition to adding iron to the sludge in the form of iron (ferric) oxide, iron can be added into the sludge in other forms as well including, for example, iron sulfate, metallic iron, iron carbonate and iron phosphate. Preferably, the iron is converted into iron sulfate prior to being reacted with acid and ammonia to produce fertilizer.

In one embodiment the iron (ferric) oxide is added as a powder to a mixing tank containing water and sulfuric acid. The water and sulfuric acid can include of the blowdown water from the air emission scrubbing system which contains water, sulfuric acid and ammonium sulfate. The addition of the sulfuric acid in this mixing tank converts the iron oxide to an iron (ferric) sulfate. This mixture of iron sulfate in water and ammonium sulfate is then added to the biosolids slurry to facilitate product hardness and odor.

In addition to iron, other metallic salts, for example zinc oxide, can be added to the slurry prior to reaction to achieve similar benefits as described herein.

It has been surprisingly discovered that by adding a metal salt such as iron sulfate or zinc sulfate or magnesium sulfate, into the sludge, a significant improvement to the sludge to fertilizer process can be produced. Preferably, enough metal salt, such as ferrous salt or ferric salt, is added to the sludge to produce a fertilizer product with 0.1 wt % to 10 wt % metal salt, such as iron sulfate. More preferably, the finished fertilizer product has between 0.5 wt % and 5 wt % metal salt, such as iron sulfate. Most preferably, 1 wt % to 3 wt % metal salt such as ferrous or ferric sulfate. The addition of iron makes it easier to control the process and provides a variety of other improvements to the process. These improvements include:

a) Chemically bonded metal, such as iron, in the product. The metal, such as iron is able to complex with components of the organics in the mixture as well as the ammonium sulfate salt present in the mixture.

b) Metal, such as iron or zinc, binding to reduce sulfur compounds. The consequence of this binding is that these reduced sulfur compounds are less able to volatize to the atmosphere or environment therefore the perceived odor of the product is significantly reduced.

c) Increased hardness of the product granule. The crush weight of the product is increased significantly from approximately 4 to 5 pounds to over 6 pounds and more preferably over 7 pounds. The invention has also been measured to create granules in the 8 to 9 pound hardness range.

d) Reduced dust associated with the product so that storage and transport of the product is improved.

e) Reduced odor of the product will enhance the marketability of the product in the commodity and specialty fertilizer business.

f) Reduced volatility of nitrogen so that when the Unity fertilizer product is used in the field on hard ground the amount of nitrogen that is lost to the atmosphere is significantly reduced, especially compared to the up to 40% volatility of urea as used in commercial fertilizer practice.

g) Acid conversion of iron oxide to iron sulfate prior to mixing with biosolids slurry.

h) Metal availability, such as iron or zinc, as increased micronutrient. This is because of the addition of a metallic salt to the mixture but also because of the binding of the metal to organic components of the mixture such that the solubility of the metal, such as iron, in water is enhanced.

i) Creates a lower staining product as compared to conventional products. Metallic salt, such as ferrous or ferric oxide or sulfate is preconditioned in a sump prior to its addition to the biosolids slurry. This preconditioning converts the iron to a black compound and avoids the red staining characteristic that was associated with the ferric oxide form of the iron as previously added.

The product as manufactured under this invention incorporates a range of chemical conversions that are important components of the finished fertilizer. The addition of iron in combination of the sulfuric acid in the "preconditioning" of the mixture prior to passing the mixture through the Pipe-cross reactor causes a range of conditions in the mix which affect the operation of the pipe-cross reactor and the chemical makeup of the final product as follows:

a) it enhances the reaction kinetics of the pipe-cross reactor.
b) it causes enhanced granulation.
c) Starts the chemical hydrolysis of the organic molecules in the sludge slurry, e.g., the conversion of proteins to peptides and amino acids, and/or the conversion of lipids to component molecules such as fatty acids. The chemical hydrolysis of long chain organic molecules, e.g., proteins, carbohydrates, lipids and nucleic acids creates molecules that are more easily able to bind to the iron; that can be more easily assimilated by the soil microorganisms around the root zone of the target crop and that can be more easily directly assimilated by the roots and root hairs of the target crop such that the crop benefits with increased vitality, growth and productivity. Further the hydrolysis of organic molecules by the hydrolysis process associated with the operation of the Pipe cross reactor renders the final product safer than those products that would combine the biosolids organics without such hydrolysis. An example of this would be the hydrolysis of endocrine disrupter compounds which in the environment have been shown to mimic endocrine hormones and affect the sexuality of animals, e.g., alligators and frogs. The disruption of these compounds will increase the public and scientific confidence that the use of biosolids products is safe for public health.
d) Drives reduced sulfur compounds out of the biosolids slurry such that these odorant sources are no longer a component or are a reduced component of the finished product.
e) Lowers the viscosity of the biosolids slurry such that the operation of the Pipe-cross reactor is more controllable.
f) Improves the mixing that occurs in the Pipe cross reactor.

Other embodiments and uses of the invention will be apparent to those skilled in the art from consideration of the specification and practice of the invention disclosed herein. All references cited herein, including all U.S. and foreign patents and patent applications, including U.S. Provisional Application No. 60/473,198 and the corresponding non-provisional application being filed contemporaneously herewith and U.S. patent application Ser. Nos. 08/852,663, 09/735,768 and 09/416,370, are specifically and entirely incorporated herein by reference. It is intended that the specification and examples be considered exemplary only.

The invention claimed is:

1. A process for preparing conditioned biosolids for use in producing fertilizer, the process comprising:
   introducing biosolids into a receiving bin;
   conveying the biosolids to a pump;
   introducing a combination of sulfuric acid and an iron oxide having a pH of about 2 to about 2.5 into the biosolids to create a mixture;
   pumping said mixture to a shear mix tank;
   introducing sulfuric acid into the mixture; and
   shear mixing the mixture to form conditioned biosolids, wherein the pH of the conditioned biosolids is 3 to 4.

2. A process according to claim 1 further comprising passing the biosolids through a lump breaker prior to pumping the mixture.

3. A process according to claim 2 further comprising introducing water into the biosolids prior to passing through the lump breaker.

4. A process according to claim 1, wherein the sulfuric acid is introduced into the mixture at a rate of about 1.75% by weight of the mixture.

5. A process according to claim 1, wherein the iron oxide is ferrous oxide.

6. A process according to claim 1, wherein the iron oxide is ferric oxide.

7. A process for creating fertilizer comprising:
   mixing biosolids with a combination of sulfuric acid and an iron oxide having a pH of about 2 to about 2.5 to create a mixture;
   pumping said mixture to a shear mix tank;
   introducing sulfuric acid into the mixture; and
   shear mixing the mixture to form conditioned biosolids, wherein the pH of the conditioned biosolids is 3 to 4;
   mixing the conditioned biosolids, an acid and a base in a pipe cross reactor to form a hot melt;
   processing the hot melt in a granulator to form granulated particles; and
   drying the granulated particles to form granules of fertilizer, wherein the granules have a hardness greater than about 6 pounds.

8. A process according to claim 7, wherein the acid comprises sulfuric acid and the base comprises ammonia.

* * * * *